United States Patent [19]

Mosher et al.

[11] Patent Number: 5,198,519
[45] Date of Patent: Mar. 30, 1993

[54] SILAZANE POLYMERS AND METHOD OF MAKING SAME

[75] Inventors: P. V. Mosher, Redondo Beach; K. Allen, Long Beach, both of Calif.

[73] Assignee: The Standard Oil Company, Cleveland, Ohio

[21] Appl. No.: 691,624

[22] Filed: Apr. 25, 1991

[51] Int. Cl.$^5$ ............................................. C08G 77/04
[52] U.S. Cl. ........................................ 528/28; 528/27; 528/38
[58] Field of Search .............................. 528/28, 38, 27

[56] References Cited

U.S. PATENT DOCUMENTS

| | | | |
|---|---|---|---|
| 4,687,657 | 8/1987 | Clark et al. | 423/412 |
| 4,696,827 | 9/1987 | Okamura et al. | 427/36 |
| 4,705,837 | 11/1987 | Seyferth | 528/31 |
| 4,767,831 | 8/1988 | Bartos et al. | 525/474 |
| 4,820,783 | 4/1989 | Seyferth et al. | 525/474 |
| 4,833,107 | 5/1989 | Kaya et al. | 501/97 |
| 4,835,238 | 5/1989 | Burns | 528/28 |
| 4,975,512 | 12/1990 | Funayama et al. | 528/28 |

OTHER PUBLICATIONS

"Preparation of Aluminum Nitride", P. Popper, Academic Press London & New York, pp. 50–51, 1962.
"Diamines and Higher Amines, Aliphatic", Dow Chemical, USA, vol. 7, pp. 580–602.
"Organometallic Polymers as Precursors to Ceramic Materials: Nitride and Silicon Oxynitride", R. M. Laure et al., UltraStructure Processing of Ceramics, Glasses and Composites, Feb. 23, 1987, pp. 1 to 14.
"Preparation of Silicon Carbide–Silicon Nitride Fibers by the Controlled Pyrolysis of Polycarbosilazine Precurs." Journal of Applied Polymer Science, vol. 27, pp. 3751–3761, 1982.

Primary Examiner—Melvyn I. Marquis
Attorney, Agent, or Firm—Larry W. Evans; David J. Untener; Scott A. McCollister

[57] ABSTRACT

A method for preparing silazane polymers is disclosed which comprises reacting under transamination conditions:

(A) one or more silicon amides represented by the general formula:

$$((R^1)_2N)_a\text{-Si}(R)_b$$

wherein each R is independently hydrogen or a hydrocarbon group, a is an integer from two to four, b is an integer from zero to two and the sum of a and b equals four; with (B) one or more polymers.

Also, disclosed are the silazane polymers produced by this method and silicon ceramics produced from these polysilazanes.

11 Claims, No Drawings

SILAZANE POLYMERS AND METHOD OF MAKING SAME

BACKGROUND OF THE INVENTION

1. Technical Field

This invention relates to novel preceramic silazane polymers, a method of preparing such polymers from silicon amides and polyamines and ceramics prepared from these polysilazanes.

2. Description of Related Art

The development of new and improved preceramic silicon-containing polymers continues to be of significant interest. Of particular interest are silazane polymers because upon pyrolysis these polymers convert predominantly to silicon carbide and/or silicon nitride which are useful in the preparation of oxidation resistant, high temperature materials.

A common method for preparing silazane polymers involves the use of halogenated reactants such as halosilanes. For example, U.S. Pat. No. 3,885,567 discloses shaped articles comprising a homogeneous mixture of silicon carbide and silicon nitride. These articles are made from carbosilazane resins which are derived from the reaction of chlorosilanes and amines.

U.S. Pat. Nos. 4,395,460 and 4,404,153 disclose processes for preparing polysilazane polymers by contacting and reacting disilanes with ammonia and disilazane, respectively.

U.S. Pat. No. 4,543,344 discloses a process for preparing $R_3SiNH$-containing hydrosilazane polymers by contacting and reacting trichlorosilane with a disilazane $(R_3Si)_2 NH$ where R is vinyl, hydrogen, phenyl or alkyl radicals containing 1 or 3 carbon atoms.

These processes which involve the use of halogen containing silazanes to prepare polysilazanes require difficult procedures to eliminate the halogen containing by-products created by this reaction.

A process for preparing halogen free polymers has been proposed in U.S. Pat. No. 4,675,424 which describes a method for preparing silazane polymers by reacting in the presence of catalyst an aminosilane with ammonia or other useful amines. The preferred amines are ammonia and monomethylamine. The patent discloses higher equivalent weight amines such as ethylenediamine, propylamine, allylamine and aniline.

There is still a need to develop preceramic polymers that are free of catalytic impurities and have improved properties which make them suitable for lamination uses and allow the polymers to retain much of their strength during pyrolysis.

SUMMARY OF THE INVENTION

The present invention contemplates an inexpensive and controllable method for producing thermosetting silazane resins in high yield. This method does not require the use of catalysts or accelerators. The polysilazane resins of this invention are capable of thermosetting in the absence of catalyst or accelerators. This development provides an improved method for producing fiber reinforced silicon nitride/silicon carbide composites through polymer pyrolysis. These composites, specifically those reinforced with refractory fibers, are particularly useful for high temperature, structural applications. The resins of this invention retain their strength and shape during pyrolysis which enables composites made with these resins to resist delamination during pyrolysis and allows for the fabrication of complex shaped fiber reinforced ceramic composites.

Broadly stated, this invention relates to a method for preparing silazane polymers which comprises reacting under transamination conditions one or more silicon amides and one or more polyamines.

This invention also relates to the silazane polymers produced by this method and silicon ceramics produced from these silazane polymers.

DESCRIPTION OF THE PREFERRED EMBODIMENTS

The present invention provides a method for preparing silazane polymers which comprises reacting under transamination conditions:

A) one or more silicon amides represented by the general formula:

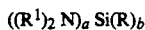

$$((R^1)_2 N)_a Si(R)_b$$

Wherein each R is independently hydrogen or a hydrocarbon group, each $R^1$ is a saturated hydrocarbon group, a is an integer from two to four, b is an integer from zero to two and the sum of a and b equals four; with B) one or more polyamines.

When used herein the term hydrocarbon group means and includes aliphatic (e.g., alkyl or alkenyl), alicyclic (e.g., cycloalkyl or cycloalkenyl), aromatic, aliphatic- and alicyclic-substituted aromatic, aromatic-substituted aliphatic and alicyclic radicals, and the like, as well as cyclic radicals wherein the ring is completed through another portion of the molecule (that is, any two indicated substituents may together form an alicyclic radical).

The hydrocarbon group may contain non-reactive or non-hydrocarbon substituents or heteroatoms which, in the context of this invention, do not materially alter the transamination reaction between the silicon amides and polyamines of this invention. Amino groups and nitrogen heteroatoms may be present in the hydrocarbon group. Preferably there is an absence of substituents groups or heteroatoms; particularly the hydrocarbon groups of this invention are substantially free of sulfur and oxygen atoms. Preferrably R is substantially free of acetylenic and olefinic unsaturation.

Usually, when R is a hydrocarbon group it is alkyl, aryl, alkaryl, arylalkyl or mixtures thereof containing up to 12 carbon atoms. Preferably, when R is a hydrocarbon group it is alkyl and typically contains from 1 up to about 6 carbon atoms.

$R^1$ in the silicon amides used in this invention is a saturated hydrocarbon group which means hydrocarbon groups substantially free of acetylenic and olefinic unsaturations and includes alkyl, cycloalkyl, aromatic, cycloalkyl radicals and the like, as well as cyclic radicals wherein the ring is completed through another portion of the molecule (that is, any two $R^1$ substituents taken together form a cycloalkyl radical). Acetylenic and olefinic unsaturation may be present, however, to the extent that they do not materially alter the transamination reaction between the silicon amide and the polyamines of this invention. $R^1$ is typically an alkyl group, preferably containing from 1 up to about 10 carbon atoms.

The preferred silicon amides useful in this invention are represented by the general formula:

$((CH_3)_2N)_aSi(R^5)_b$ wherein $R^5$ is independently hydrogen or a hydrocarbon group selected from alkyl groups having from 1 up to about 6 carbon atoms and aryl, alkaryl and arylalkyl groups having up to about 12 carbon atoms; a is equal to 2 or 3, b is equal to 1 or 2, preferably 2, and the sum of a and b is equal to 4.

Silicon amides and methods for their preparation are known in the art. Commercially available silicon amides useful for the purposes of this invention include bis(dimethylamino)methylsilane and tris(dimethylamino)methylsilane. Other silicon amides useful for the purpose of this invention and methods for their preparation may be found in M. F. Lappert, P. R. Power, A. R. Sanger and R. C. Srivastava, *Metal and Metalloid Amides*, John Wiley & Jones, New York (1980), pages 235–371 which is incorporated herein by reference for disclosures in this regard.

The polyamines useful in this invention are amines represented by the general formula:

$$HN(R^2-N)_nH$$
$$\;\;|\;\;\;\;\;\;|$$
$$R^3\;\;\;R^4$$

wherein each $R^3$ and $R^4$ is independently hydrogen or a hydrocarbon group, $R^2$ is a divalent hydrocarbon group and n is at least 1. Preferably n is less than 10.

In a preferred embodiment, $R^2$ is a divalent hydrocarbon group selected from divalent alkyl groups containing from 1 up to about 6 carbon atoms and divalent aryl, alkaryl, arylalkyl groups having up to about 12 carbon atoms. These polyamines includes methylene amines, ethylene amines, butylene amines, propylene amines, pentylene amines, hexylene amines, heptylene amines, octylene amines, other polymethylene amines, and also the cyclic and the higher homologs of such amines such as piperazines and amino-alkyl-substituted piperazines. They are exemplified specifically by: ethylene diamine, triethylene tetramine, propylene diamine, decamethylene diamine, octamethylene diamine, di(heptamethylene) triamine, tripropylene tetramine, tetraethylene pentamine, trimethylene tetramine, pentaethylene hexamine, di(trimethylene)triamine, 2-heptyl-3-(2-aminopropyl) imidazoline, 4-methylimidazoline, 1,3-(2-aminopropyl) imidazoline, 4-methylimidoline, 1,3-bis(2-aminopropyl) imidazoline, pyrimidine, 2-(-aminopropyl)piperazine, 1,4-bis(2-aminoethyl) piperazine, and 2-methyl-1-(2-aminobutyl) piperazine. Higher homologs such as are obtained by condensing two or more of the above illustrated alkylene amines likewise are useful.

The ethylene amines are useful for the purposes of this invention and are described in some detail under the heading "Diamines and Higher Amines, Alphatic" in "Encyclopedia of Chemical Technology," Kirk and Othmer, volume 7, pages 580–602, Interscience Publishers, New York (1979) and which is incorporated herein by reference for disclosures of amines useful for the purposes of this invention and their method of preparation.

The preferred polyamines are diamines and can be represented by the general formula:

$$H_2N-R^6-NH_2$$

where $R^6$ is a divalent hydrocarbon group selected from divalent alkyl groups having from one up to six carbon atoms and divalent aryl, alkaryl and arylalkyl groups having up to twelve carbon atoms. Particularly preferred diamines are diaminoethane (ethylenediamine) and the propylene diamines 1,2-diaminopropane and 1,3-diaminopropane.

The method of this invention is the reaction of silicon amides and polyamides via a transamination reaction to form silazane polymers. The transamination reaction can take place in the absence of a catalyst or accelerator. The polyamine reactant must have a higher boiling point than amine derived from the amino moiety of the silicon amide reactant. The typical transamination reaction conditions involve contacting the reactants under temperature and pressure conditions sufficient to allow for the removal of the amine derived from the silicon amide. The transamination reaction is typically run at 90°–130° C. at atmospheric pressure. The resinous transamination product can be thermoset by heating from 180° C. up to about 280° C. Higher temperatures up to about 350° C. are possible but not usually necessary. These processes are preferrably run under moisture free and oxygen free conditions. It is preferred to run the reaction under an inert gas such as nitrogen. The reaction mixture is heated for a sufficient period of time to accomplish the desired level of transamination. The extent of transamination is usually determined by the viscosity of the solution. The molar ratio of silicon amide to polyamine can range from about 0.5:1 to 2:1. A ratio of 1:1 is preferred.

The reactions of this invention can be conveniently carried out in a substantially insert solvent medium. This solvent serves to maintain contact of the reactants and facilitates control of the reaction temperature. A used herein a solvent is substantially inert when that solvent is largely unreactive with the reactants of this invention. Typical solvents are alkanes such as heptanes, octanes or decane and alkylated benzenes such as toluene or xylene. The amount of solvent is not critical, but is typically sufficient to maintain a fluid reaction mixture. A common ratio of starting reactants to solvents is from about 2:1 to about 10:1 by weight, preferably 1:1 by weight.

After the reaction is completed, the solvent may be removed by heat and vacuum evaporation without a filtration step if the resulting polysilazane is a solvent soluble product, or by filtration if the resulting polysilazane is a solvent insoluble product.

Although the exact nature of the silazane polymer prepared by the process of this invention is not known, it is believed that in its simplest form—when the silicon amide is a diamide and the polyamine is a diamine—the resulting transamination polymer is linear and will cross-link with heat to produce a thermoset polymer. While not being bound by theory, the cross-linking is believed to occur at Si—H bonds when present and by latent transamination reactions.

The polysilazane polymers prepared by the transamination reaction of this invention will cross-link with heat to produce a thermoset polymers. The cured polymer will, while maintaining its strength, convert to a thermally stable silicon carbide/silicon nitride ceramic under pyrolysis temperatures of about 700°–1600° C. The resulting silicon ceramics are oxidation resistant, high temperature materials. These materials may be used for structural, insulative, ablative and electronic applications. The resins of this invention can be used to produce ceramic composites made with glass, carbon and/or silicon carbide fibers. The resins of this invention can also be cast with or without fillers to produce shaped silicon ceramic articles. They may also find use in the production of silicon ceramic fibers, powders, foams, coatings and reimpregnants.

This invention allows for the production of fiber reinforced silicon nitride/silicon carbide composites by a relatively simple process. Carbon and/or ceramic cloth is impregnated with a solution of a thermosetting polysilazane resin. The polysilazane resin may, if desired, be combined with one or several fillers (e.g. silicon carbide, silicon nitride, carbon, etc.) prior to the impregnation in order to impart specific properties to the composite. The impregnated cloth is then usually heated to partially cure the resin to allow for easier molding. The staged cloth is then cut into patterns, laid up as desired, and molded at temperatures near 400° C. under 300 PSI. The molded part may then be carbonized up to temperatures from 800°-1500° C. in order to convert the polysilazane matrix to predominantly silicon carbide/silicon nitride. The resulting ceramic matrix composite may then be densified by reimpregnation with the polysilazane resin and/or by chemical vapor infiltration techniques.

This invention provides a process for the synthesis of thermosetting polysilazane resins. These resins make the production of complex shaped silicon carbide/silicon nitride matrix composites possible. These preceramic polymers are capable of thermosetting at low temperatures ($\leqq 200°$ C.) in the absence of oxygen, water, or a foreign catalyst and maintain their strength during the conversion (pyrolysis) process.

The resins of this invention retain much of their strength and shape during the pyrolysis process. This property enables laminated composites made with these resins to resist delamination during pyrolysis. These properties are essential to the successful use of a preceramic polymer as a laminating resin for the production of complex shaped fiber reinforced ceramic composites.

This invention is exemplified in the following examples. Of course, these examples are not intended as limiting this invention as modification of the examples by ordinary expedient will be readily apparent to those of ordinary skill in the art.

In all examples, unless otherwise stated, all parts are parts by weight and all percentages are derived from parts by weight.

EXAMPLE 1

A reaction mixtures was prepared under a dry nitrogen atmosphere by the addition of 16.8 parts of dry toluene, 7.7 parts (0.058 moles) of commercially available bis(dimethylamino)methylsilane and 4.3 parts (0.058 moles) of dry 1,2-diaminopropane to a reaction vessel. The reaction mixture was heated with stirring to 110° C. under a nitrogen blanket and heated at reflux (105°-110° C.) for 103 hours and dimethylamine gas was released. The reaction mixture was stripped to 120° C. The residue was cooled to 22° C. and then placed under strong vacuum to remove residual volatiles to yield 5.9 parts of a pale yellow product. This product was then heated at 200° C. for three hours under a nitrogen flush to yield a cured product. The cured product was then pyrolyzed by heating to 800° C. in an argon environment over an 8 hour period to yield a glossy black solid char having 17% nitrogen, 23% carbon 3% oxygen.

EXAMPLE 2

A reaction mixture was prepared under a dry nitrogen atmosphere by the addition of 10 parts of dry toluene, 7.7 parts (0.058 moles) bis(dimethylamino)methylsilane and 3.5 parts (0.058 moles) of dry diaminoethane to a reaction vessel. The reaction mixture was heated with stirring to 112° C. under a nitrogen blanket and heated at reflux for 7 hours and dimethylamine was released. The reaction mixture was stripped to 120° C. over a one hour period. The residue was cooled to 25° C. and then placed under a strong vacuum to remove residual volatiles to yield a viscous translucent product. This product was then heated to 200° C. over three hours and held at 203° C. for 1 hour to yield a cured product. The cured product was pyrolyzed by heating to 800° C. in an argon environment over an 8 hour period to yield a black solid.

EXAMPLE 3

A reaction mixture was prepared under a dry nitrogen atmosphere by the addition of 16.8 parts of dry toluene, 7.7 parts (0.058 moles) of bis(dimethylamino)methylsilane, and 4.3 parts (0.058 moles) of dry 1,3-diaminopropane to a reaction vessel. The reaction mixture was heated with stirring to 110° C. under a nitrogen blanket and kept at a temperature between 105°-110° C. for 100 hours as the solution refluxed and dimethylamine gas was released. The reaction mixture was then brought to 120° C. and the toluene was allowed to distill off. The residue was then cooled to 25° C. and placed under a strong vacuum to remove residual volatiles and yield 5.9 parts of a pale yellow viscous liquid. The liquid was heated to 200° C. for 3 hours under a nitrogen flush to yield a tough, opaque solid. The solid was then pyrolyzed by heating to 800° C. in an argon environment over an 8 hour period to yield a hard, glossy black solid which retained 59% by weight of the starting solid.

EXAMPLE 4

A reaction mixture is prepared in a dry nitrogen atmosphere by the addition of 17 parts of dry toluene, 7.7 g (0.058 moles) of bis(dimethylamino)methylsilane, and 5.1 parts (0.058 moles) of dry 2,3 diaminobutane to a reaction vessel. The reaction mixture is heated with stirring to 110° C. under a nitrogen blanket. The mixture is kept at a temperature between 105°-110° C. for 100 hours as the solution refluxes and dimethylamine gas evolves. The solution is then brought to 120° C. and the toluene is allowed to distill off. The residue is then cooled to 25° C. and placed under a strong vacuum to remove residual volatiles. The residue polymer product is heated at 200° C. for 3 hours under a nitrogen flush to thermoset the polymer. The thermoset polymer is converted to a ceramic by heating to 800° C. over an 8 period in a nitrogen environment.

EXAMPLE 5

A reaction mixture is prepared in a dry nitrogen atmosphere by the addition of 17 parts of dry toluene, 7.7 g (0.058 moles) of bis(dimethylamino)methylsilane, and 6.7 parts (0.058 moles) of dry 1,6diaminohexane to a reaction vessel. The reaction mixture is heated with stirring to 110° C. under a nitrogen blanket. The mixture is kept at a temperature between 105°-110° C. for 100 hours as the solution refluxes and dimethylamine gas evolves. The solution is then brought to 120° C. and the toluene is allowed to distill off. The residue is then cooled to 25° C. and placed under a strong vacuum to remove residual volatiles. The polymer product is heated to 200° C. for 3 hours under a nitrogen flush to thermoset the polymer. The thermoset polymer is converted to a ceramic by heating to 800° C. over an 8 period in an argon environment.

EXAMPLE 6

In a 3.0"×3.0" steel die cavity under a dry nitrogen atmosphere was placed four 3.0"×3.0" sections of Nicalon 8 harness satin cloth from Nippon Carbon made of silicon carbide fiber (8.7 parts) and 11 parts of a propyl polysilazane resin @73% solids prepared according to the general procedure described in Example 1. The resin was distributed on the surface of each ply and then the plunger was inserted into the cavity. The die was then removed from the nitrogen atmosphere, placed in a teflon bag equipped with a gas inlet and outlet, and placed in a hydraulic press. A nitrogen flush was then initiated through the teflon bag. The press was heated to 420° F. over a 70 minute period as the pressure on the part was gradually increased to 220 PSI. The press was kept at 415° F. for an additional 2½ hours and then cooled to below 90° F. The die was removed from the press and then taken out of the teflon bag. The part was then removed from the die, characterized, and pyrolyzed to 1500° F. over a 72 hour period to yield a reinforced silicon-carbon-nitrogen ceramic composite.

EXAMPLE 7

One 4.0"×4.0" sheet of Torray M-40, carbon, 8 harness satin fabric was impregnated with 6.6 parts of a slurry consisting of 12.5% boron carbide powder, 59.0% polysilazane resin made according to the general procedure described in Example 1, and 28.3% toluene. The sheet was placed in a vacuum chamber and evacuated for 90 minutes to remove the toluene solvent. The impregnated fabric was cut into 4 2.0"×2.0" plies and stacked in an alternating pattern such that half of the warp fibers were aligned in the "x" direction and the other half were aligned perpendicular to the "x" direction. The plies were then sandwiched between two metal plates and sealed in a plastic bag with an exhaust outlet. The part was then placed in an autoclave and the exhaust outlet was connected to a vacuum. The autoclave was pressurized to 225 PSI, brought to 460° F. within 90 minutes, and held at 460° F. for an additional 4 hours. The autoclave was then cooled and the consolidated plies (composite) removed. The composite is then placed in a furnace and brought to 1500° F. in 72 hours in argon to form a pyrolyzed panel. The panel which had shrunk 1.9% in thickness, was then removed and placed in another furnace and brought to 2200° F. in 10 hours in argon. The reinforced ceramic panel was then infiltrated once with pyrolytic carbon via a chemical vapor infiltration process.

What is claimed is:

1. A method for preparing silazane polymers which comprises reacting under transamination conditions and in the absence of catalyst or accelerator;
A) one or more silicon amides represented by the general formula:

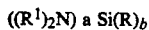

wherein each R is independently hydrogen or a hydrocarbon group, each $R^1$ is a saturated hydrocarbon group, a is an integer from two to four, b is an integer from zero to two and the sum of a and b equals four; with
B) one or more polyamines represented by the general formula:

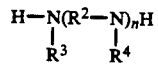

wherein each $R^3$ and $R^4$ is independently hydrogen or a hydrocarbon group, $R^2$ is a divalent hydrocarbon group, and n is at least 1.

2. A method according to claim 1 wherein $R^3$ and $R^4$ are each independently hydrogen or a hydrogen group having from one up to about 12 carbon atoms and n is at least 2.

3. A method according to claim 1 wherein $R^2$ is a divalent hydrocarbon group selected from divalent alkyl groups having from one up to about six carbon atoms or divalent aryl, alkaryl and arylalkyl groups having up to about 12 carbon atoms.

4. A method according to claim 1 wherein $R^1$ is selected from alkyl groups having from one up to about 10 carbon atoms, and a is equal to two or three.

5. A method according to claim 3 wherein $R^1$ is methyl, at least one R is hydrogen and a is equal to two or three.

6. A method according to claim 4 wherein $R^3$ and $R^4$ are hydrogen and $R^2$ is a divalent alkyl group having from 1 up to 4 carbon atoms and n is equal to 1.

7. A method for preparing silazane polymers which comprises reacting under transamination conditions and in the absence of catalyst or accelerator:
A) one or more silicon amides represented by the general formula:

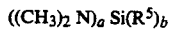

wherein each $R^5$ is independently hydrogen or a hydrocarbon group selected from alkyl groups having from 1 up to about 6 carbon atoms or aryl, alkaryl or arylalkyl groups having up to 12 carbon atoms; a is equal to 2 or 3, b is equal to 1 or 2 and the sum of a and b is equal to 4; with
B) one or more diamines represented by the general formula:

wherein $R^6$ is a divalent hydrocarbon group selected from divalent alkyl groups having from 1 up to 6 carbon atoms, or divalent aryl, alkaryl or arylalkyl groups having up to 12 carbon atoms; with the proviso that said diamines have a higher boiling point than dimethyl amine.

8. The silazane polymers prepared in accordance with the method of claim 1.

9. The silazane polymers prepared in accordance with the method of claim 5.

10. The silazane polymers prepared in accordance with the method of claim 6.

11. The silazane polymers prepared in accordance with the method of claim 7.